US009396501B1

(12) United States Patent
Nestler et al.

(10) Patent No.: US 9,396,501 B1
(45) Date of Patent: Jul. 19, 2016

(54) MULTI-LEVEL FOLLOWING MECHANIC FOR A SOCIAL NETWORK

(71) Applicant: Google Inc., Mountain View, CA (US)

(72) Inventors: Michael Nestler, Menlo Park, CA (US); Karthik M. Nagaraj, Livermore, CA (US); Dennis Troper, Los Altos, CA (US); Pavan Desikan, Palo Alto, CA (US); Pavani Diwanji, Mountain View, CA (US)

(73) Assignee: Google Inc., Mountain View, CA (US)

( * ) Notice: Subject to any disclaimer, the term of this patent is extended or adjusted under 35 U.S.C. 154(b) by 699 days.

(21) Appl. No.: 13/668,161

(22) Filed: Nov. 2, 2012

Related U.S. Application Data

(60) Provisional application No. 61/556,139, filed on Nov. 4, 2011.

(51) Int. Cl.
*G06Q 50/00* (2012.01)
*H04L 29/08* (2006.01)
*G06Q 30/02* (2012.01)

(52) U.S. Cl.
CPC .............. *G06Q 50/01* (2013.01); *H04L 67/306* (2013.01)

(58) Field of Classification Search
CPC .... G06Q 50/00–50/34; G06Q 30/00–30/0272; H04L 65/00–65/80; H04L 67/00–67/08
See application file for complete search history.

(56) References Cited

U.S. PATENT DOCUMENTS

| 2005/0171954 | A1* | 8/2005 | Hull et al. ........................ 707/10 |
| 2008/0077517 | A1* | 3/2008 | Sappington ...................... 705/35 |
| 2010/0281059 | A1* | 11/2010 | Lynch ..................... G06Q 30/02 707/784 |
| 2011/0196923 | A1* | 8/2011 | Marcucci et al. ............. 709/204 |
| 2011/0196927 | A1* | 8/2011 | Vance ............................ 709/204 |
| 2011/0296004 | A1* | 12/2011 | Swahar ......................... 709/224 |
| 2012/0166267 | A1* | 6/2012 | Beatty ................ G06Q 30/0247 705/14.21 |
| 2012/0239507 | A1* | 9/2012 | Braginsky .............. G06Q 10/10 705/14.69 |

* cited by examiner

*Primary Examiner* — Nicholas Taylor
*Assistant Examiner* — Clayton R Williams
(74) *Attorney, Agent, or Firm* — Lowenstein Sandler LLP (57) ABSTRACT

Methods, systems, and computer programs are presented for managing interaction between users in a social network. One method includes providing a user account having information that identifies a person associated with the user account. The method further includes receiving interactivity of the person on the user account. The received interactivity identifying endorsements made by the person utilizing the user account, and the endorsements made by the person are associated to a soft following metric. The method also includes identifying entities selected for following by the person of the user account. The selection for following triggered by direct action by the person on the user account to add an entity to one or more groups created at the user account. The selection for following being associated with a hard following metric that allows the entity having an entity account to post data to the user account of the user.

24 Claims, 8 Drawing Sheets

MULTI-LEVEL FOLLOWING MECHANIC FOR A SOCIAL NETWORK

CLAIM OF PRIORITY

This application claims priority to U.S. Provisional application No. 61/556,139, filed on Nov. 4, 2011, which is herein incorporated by reference.

BACKGROUND

The present disclosure relates to methods, systems, and computer programs for managing the flow of messages among users of a social network, and more particularly, for managing the flow of messages between persons and non-person entities.

The communication capability provided by social networks has opened new forms of communication in today's society, making it easier for people to communicate with each other, as well as providing new vehicles of communications between people and businesses, or with other community groups. As people's interest in using social networks for communication has grown, so has the interest of businesses in using social networks to communicate with people, enabling a new form of communication for keeping customers informed and promote their products.

SUMMARY

Embodiments of the present disclosure provide methods, systems, and computer programs for managing the flow of messages among users of a social network. It should be appreciated that the present disclosure can be implemented in numerous ways, such as a process, an apparatus, a system, a device or a method on a computer readable medium. Several embodiments of the present disclosure are described below.

In one embodiment, a method for managing interaction between users in a social network is disclosed. This method includes providing a user account having information that identifies a person associated with the user account. The method further includes monitoring interactivity of the person on the user account. The monitored interactivity identifying endorsements made by the person utilizing the user account, and the endorsements made by the person are associated to a soft following metric. The method also includes identifying entities selected for following by the person of the user account. The selection for following is triggered by direct action by the person on the user account to add an entity to one or more groups created at the user account. The selection for following being associated with a hard following metric that allows the entity having an entity account to post data to the user account of the user. The method further controls limited access to post data, by an entity, to the user account of the person based on a level of endorsement of the entity defined by the soft following metric.

These and other embodiments may include one or more of the following features.

One feature may include, wherein the level of endorsement is set dynamically based on past historical endorsements of the entity, wherein the entity is a commercial entity that markets goods or services.

One feature may include, wherein the information that identifies the person associated with the user account includes a name of the user and social graph associations with other people having accounts in the social network.

One feature may include, wherein the monitoring of interactivity to identify endorsements is facilitated by receiving data indicative of selection by the person of an endorsement button located on a webpage beside content related to the entity.

One feature may include, wherein the soft following metric dynamically changes over time based on the level of endorsement, such that the soft following metric increases or decreases as the level of endorsement increases or decreases.

One feature may include, wherein the level of endorsement is weighted based on how recent each one of the endorsements by the person are of the entity.

One feature may include, wherein controlling limited access to post data defines less than free access to post data to the user account of the person as compared to an entity having been identified by a hard following metric.

One feature may include, wherein the entity is a commercial entity that markets goods or services, and posting of data is in relation to the goods or services.

One feature may include, wherein to add an entity to one or more groups created at the user account includes associating the entity on a circle created on the user account, the circle being for one of the groups, wherein each circle is a graphical organizational tool enabled on the user account of the social network.

One feature may include, wherein direct action by the person on the user account includes addition of the entity or another person to one or more groups.

One feature may include, wherein direction action by the person includes dragging an entity having an entity account on the social network to one or more circle groups defined in the user account of the person.

One feature may include, wherein post data is defined by one or more of comments, images, advertisements, images, videos, pictures, or a combination thereof.

One feature may include, wherein direction by the person further includes removing the entity from the groups of the user account, the removing acting to automatically remove the person from any group established on the entity account in the social network, the removal further acting to modify the hard following metric to disable the posting of data.

In another embodiment, a method for managing interactions between users of a social network is provided. The social network enables access to a plurality of user accounts for persons and commercial entities, wherein persons have user accounts and commercial entities have entity accounts, and each account has information that identifies a person or a commercial entity. The method includes monitoring interactivity of the person on the user account, the monitored interactivity identifying endorsements made by the person utilizing the user account, and the endorsements made by the person being associated to a soft following metric. The method also includes identifying commercial entities selected for following by the person of the user account. The selection for following is triggered by direct action by the person on the user account to add a commercial entity to one or more groups created at the user account. The selection for following being associated with a hard following metric that allows the commercial entity having a commercial entity account to post data to the user account of the user. The method further controls limited access to post data, by a commercial entity, to the user account of the person based on a level of endorsement of the commercial entity defined by the soft following metric.

These and other embodiments may include one or more of the following features.

One feature may include, wherein the endorsements are made in accounts of the social network or sites outside of the social network, and a count for each of the endorsements is maintained for a global count and for endorsements by the person in the soft following metric.

One feature may include, wherein the level of endorsement is set dynamically based on past historical endorsements of the entity, wherein the commercial entity is an entity that markets goods or services.

One feature may include, wherein the information that identifies the person associated with the user account includes a name of the user and social graph associations with other people having accounts in the social network, wherein to add a commercial entity to one or more groups created at the user account includes associating the commercial entity on a circle created on the user account, the circle being for one of the groups, wherein each circle is a graphical organizational tool enabled on the user account of the social network.

One feature may include, wherein the monitoring of interactivity to identify endorsements is facilitated by receiving data indicative of selection by the person of an endorsement button located on a webpage beside content related to the commercial entity, wherein post data is defined by one or more of comments, images, advertisements, images, videos, pictures, or a combination thereof.

Other aspects will become apparent from the following detailed description, taken in conjunction with the accompanying drawings.

BRIEF DESCRIPTION OF THE DRAWINGS

The disclosure may best be understood by reference to the following description taken in conjunction with the accompanying drawings.

DETAILED DESCRIPTION

The following embodiments describe methods, systems, and computer programs for managing the flow of messages among users of a social network. It will be apparent, that the present embodiments may be practiced without some or all of these specific details.

Figure 1:
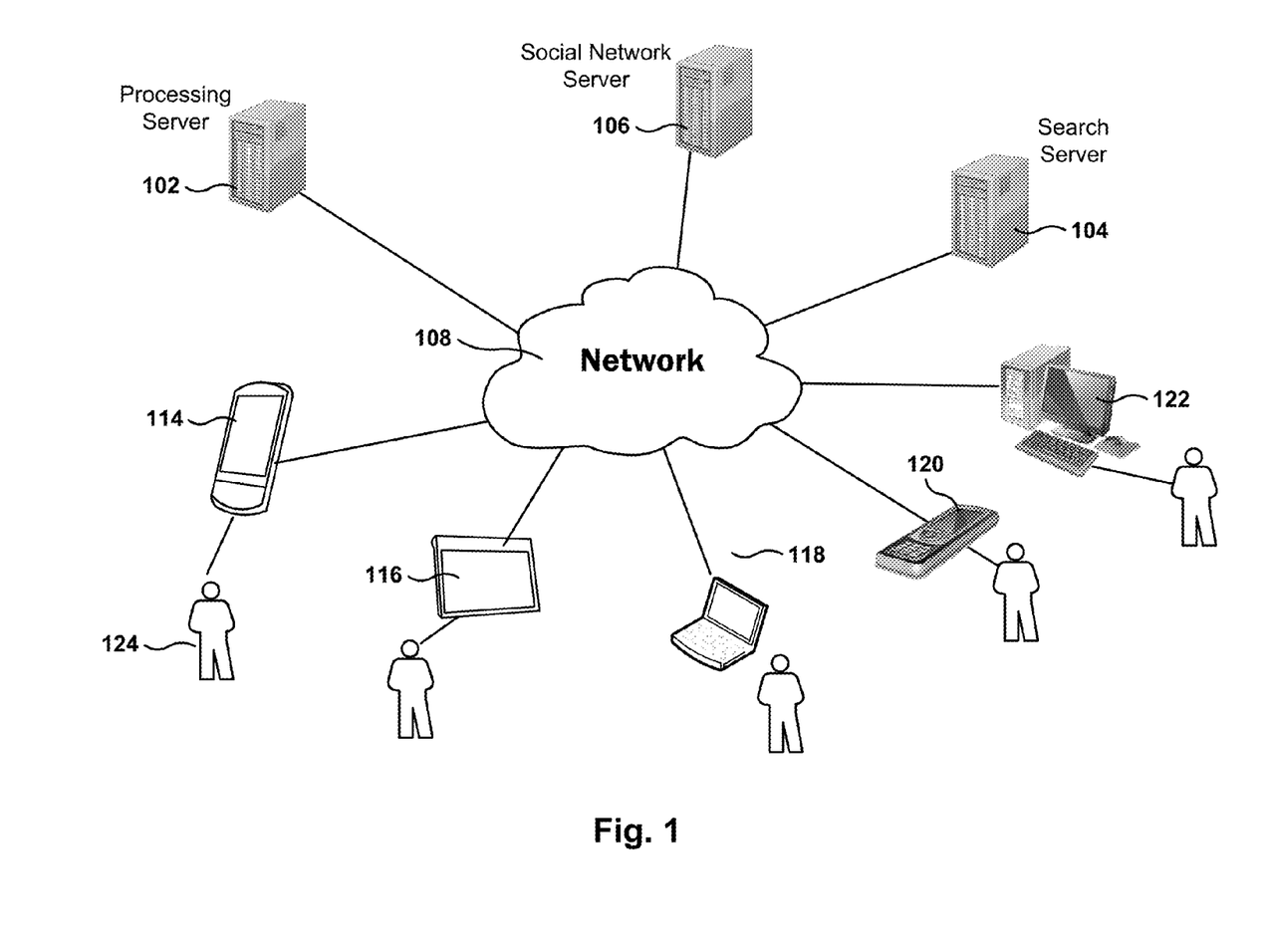
FIG. 1 illustrates the architecture of a system for implementing embodiments of the disclosure, according to one embodiment.

FIG. 1 provides one example architecture of a system that may utilize embodiments described herein. Users 124 interact with each other in the context of a social network, where users include real people and entities. In one embodiment, entities perform interactive actions similar to people, although an entity may not be an individual person. For instance, an entity may be a commercial enterprise that may wish to market goods or services. In some embodiments, a person may be an entity as well when the person is acting as a public figure, such as a popular artist, a political figure, a world leader, etc. Each user has an account in the social network, and the account includes at least a user name. In addition, each account includes a profile of the user with additional information about the user, such as birth date, gender, residence, favorite activities, etc. The user is in control of what information is added to the profile, and what information is shared with others. A user may access the social network through different devices such as a smart phone 114, a tablet computer 116, a laptop 118, a mobile phone 120, a personal computer 122, or any computing device that provides access to the Internet. Of course, the illustrated devices are only examples.

In one embodiment, social network server 106 delivers services that enable users to interface with each other. The social network provides a site that enables users to define user accounts, which can be accounts for people and entity accounts. Through those accounts, users are able to connect with their friends, group of friends, entities, groups of entities, etc. In one embodiment, the relationships established in the social network may be utilized in other contexts. Processing server 102 manages the electronic messages between persons and non-person entities, by enforcing rules that process communications and/or actions within the social network. Search server 104 provides Internet search capabilities.

In one embodiment, the social network provides customizable controls that people may use to manage interactions and communications with non-person entities. In one example, the logic executing the social network may define various services and controls. One example service is designed for real person users (e.g., user accounts). Another example service is designed for non-person entities (e.g., entity accounts). In one embodiment, a real person is a "person," that should be using his or her real name. The person can, in one embodiment, use a made-up name, so long as the person registers and is given or assigned a user account. The entity account of the entity, on the other hand, is similar to a user account of a person, however the services and controls are different. As noted above, an entity may be a business, a famous person or figure, a commercial figure, an artist, a celebrity, a government group, a brand, a political figure, a community association, a non-profit organization, an entity that provides services, an entity that provides goods, an entity that provides goods and services, etc. Furthermore, the entity may provide its goods or services primarily on the Internet, primarily as a brick and mortar outfit, or a combination thereof. For description purposes, a real person may be referred to herein as a person, people, or an individual.

For description purposes, a non-person entity may be referred to herein as simply an entity, a company, a corporation, a business, an entity account, etc. An entity may be a user, although its use will be through an entity account. A user, as referred to herein, is a generic term for a person or entity, unless otherwise noted. A non-entity user, therefore, may utilize the social network through a user account.

In one embodiment, the social network provides entities with a specific type of interface for posting messages, communicating, sharing, and generally interacting within the social network. In one embodiment, this interface for entities is referred to as "entity pages", indicated by a token, e.g. a "+", followed by the name of the entity in the social network (e.g., Acme corporation has a "+Acme" page). Real-persons have "person pages," which are different from entity pages and have different functionality, although some features are common to both entity pages and person pages. Although the symbol "+" and word "plus" is referred to herein as denoting a type of site or place within the social network, it should be appreciated that any symbol, identifier, word, or character may be used to define or identify the social services. In an alternate embodiment, the services can be provided without the use of any special symbols or denoted nomenclature. Thus, so long as the social network site provides the functionality defined herein, the nomenclature utilized to denote the services can take on any form, format or identifier.

In one embodiment, a real person may act as an entity. For example, the real person may be a public figure which uses the social network to promote commercial or social activities associated with this persona. In this case, the person is treated by the social network as an entity because the main purpose of the public figure is to promote commercial or social activities. This person may, for example, have a user account as well as an entity account. The user, when acting for the entity, will login to her entity account. The user can therefore act in various roles, consistent with their login parameters or assigned privileges. In one embodiment, a user can have multiple privileges, which will allow the user to log into her one account, and based on her privileges, will be allowed to access both accounts. Alternatively, each account will have its own login.

In one embodiment, a person is always in control of her relationships with entities (e.g., plus pages). In one embodiment, interactions between person and entity requires person approval (e.g., an addition of the plus page to the person's social network, or a mention by the person of the entity, which are discussed in more detail below). Otherwise, entity pages present a similar behavior as person pages, once the person has initiated engagement with the entity.

It is noted that the embodiments illustrated in FIG. 1 are exemplary. Other embodiments may utilize different servers, have the functionality of one server distributed over a plurality of servers, have the functionality of two or more servers combined into a single server, have a different amount of user categories in the social network, categorize users by different criteria, etc. The embodiments illustrated in FIG. 1 should therefore not be interpreted to be exclusive or limiting, but rather exemplary or illustrative.

Figure 2:
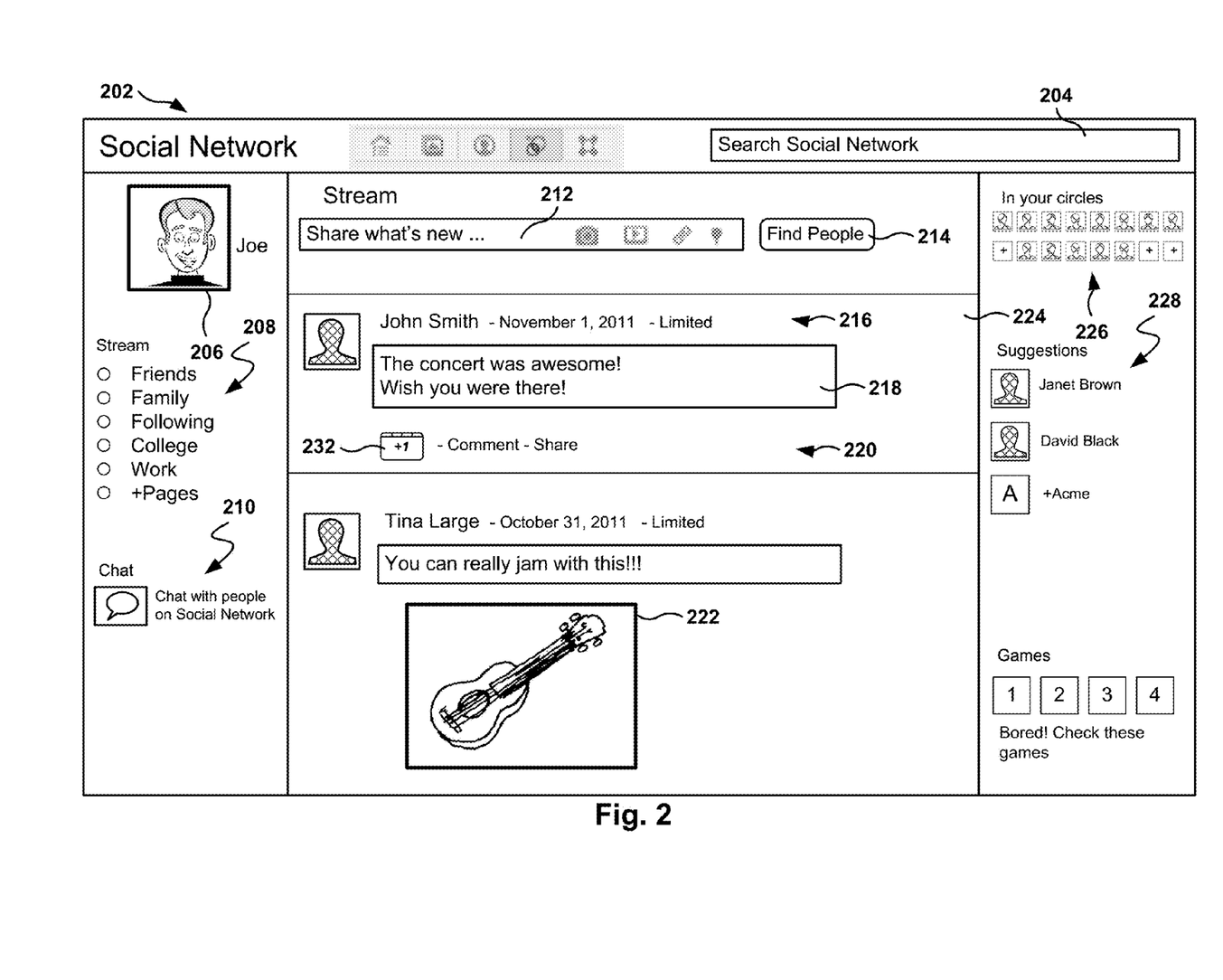
FIG. 2 is a person's web page for interfacing with a social network, according to one embodiment.

FIG. 2 is a person's web page for interfacing with a social network, according to one embodiment. For example, the person is shown logged into her user account. In one embodiment, posts received by a user are referred to as content of a stream in the social network. Page 202 is an example snapshot of a page for viewing a person's stream in the social network, and search field 204 is an input area for searching the social network or other content.

In one embodiment, the stream is presented in a middle panel of page 202. Input box 212 enables the person to add new posts in the social network. When the person enters a new post, the person is able to select the destination for the post. The destination could be to the complete social network (e.g., a public post), to a person, or to one or more groups defined by the person.

In one embodiment, the groups defined by the person are referred to as "circles," but other configurations for defining groups are also possible. Examples include various graphically designed interfaces or text based lists, dialog boxes, pull downs, radio buttons, and other interfaces defined from a combination of graphical elements, text, images, pictures, combinations thereof, etc. More details regarding the creation of circles are provided below with reference to FIG. 3. In one embodiment, the post may be a text message, a photo, a video, a link to a webpage, or a location of the person. Thus, the content and form of the post can include any data that can be presented, displayed, listened to, interfaced with, received, sent, shared, approved, or disapproved, etc.

In one embodiment, the stream includes posts added by the person, by others socially linked to the person, or by an entity that the person has chosen to follow (e.g., be linked with/to in the social network). In one embodiment, an entity may be restricted from posting to a person's stream, unless the person has established a social link with the entity beforehand, e.g., the person has chosen to follow the entity.

In one embodiment, each post 224 may include information 216 about the author, the timestamp of the post, and the scope of the post (e.g., public, limited, etc.). Example post 224 may include a text message entered by person "John Smith," but other types of posts are possible, such as photo 222, a video, a link, data, etc. The social network provides options 220 to respond to the post, such as providing an endorsement of the post, adding a comment to the post, or sharing the post with others.

As used herein, an endorsement is a public recommendation of an item, such as a webpage, a person, a post, an entity, etc. An endorsement may also be referred to or provided as an acknowledgment, a +1, a thumbs-up, a √ (check) mark, a confirmation, a ratification, a validation, a seal of approval, a testimonial, support, advocacy, an approval, a ratification, etc. In one embodiment, a button is provided in various web pages to enable the person to provide his or her endorsement. See for example +1 button 232. The various web pages can be pages on accounts of the social network, on pages of third party web sites, on search pages, in lists of search results, etc. The +1 button 232 is provided, in one embodiment, as an icon that can be selected by the user. When selected, the count associated with the +1 button is displayed, so as to provide the user with information regarding the number of other users that may have selected the +1 button.

Therefore, an endorsement button is not limited to use in the social network, and the endorsement button may appear in a variety of places and sites across the Internet. For example, an endorsement button may be next to an Internet search result, an Internet ad, a news article, a product, etc. When the person presses the endorsement button, a count associated with the item endorsed is incremented. The count measures the popularity of the item, and as people endorse an item, the counter associated with the item increases. In one embodiment, the action of endorsing an entity in the social network does not cause the entity to be linked with the person in the social network. In another embodiment, for a link to be established in the social network between the person and the entity, a different operation is required where the person explicitly adds the entity to the person's social network. The explicit add can be performed by user selection on an interface, addition of an entity to one of their groups, e.g., circle, or selection of a button, icon, or some input control to follow the entity. The following can also be triggered automatically, based on the user's approval to take this action each time the user views, finds, selects, or interfaces with an account of an entity.

In one embodiment, a "mention" is an explicit reference to a user in a communication. A mention allows the creator of the post to grab someone's attention to a post because of the introduction of a mention identifier with, for example, someone's name. In one embodiment, a mention is performed by utilizing the '+' or '@' signs followed by the name of a person or entity. It is noted that a "+" sign may be used to mention a person or an entity. When a person or an entity is mentioned within the context of the social network, the person or entity may receive a notification that they have been mentioned in a post (depending on notification settings). The user is also able to see the entirety of the post on which the user is mentioned, even if the post wasn't originally shared with the user.

Button 214 gives the person the ability to enter a different webpage, which provides an interface to identify search parameters for finding people or entities in the social network. A profile picture of the person 206 may be provided on the left side of page 202. In addition, stream filtering options 208 allows the person to limit or tune what is presented on the stream. In one embodiment, the filtering options include radio buttons to select or deselect the groups created by the person. In addition, the filtering options also include a radio button to enable or disable messages from entity pages in the stream. Although radio buttons are used, other types of user selectable controls may be used, such as drop downs, text fields, toggles, voice inputs, etc. In one embodiment, a chat button 210 is provided to allow the person to engage in conversation with others in the social network. On the right panel, icons 226 represent users in the social network that are linked with the person. In addition, the social network provides suggested new users in area 228. It is again noted that the layout of the features on the page 202 is only one example, and the layout can vary based on site designer preferences.

Embodiments of the disclosure allow people to be in control of social messages. For an entity to initiate communication with the person, the person has to first add explicitly the entity to its social network. In one embodiment, an entity is not able to initiate communications in the social network with a person that has not added the entity to its social network, or that has explicitly mentioned the entity in a post.

The person is able to perform certain operations affecting the relationship between the person and the entity. The person may endorse the entity, or the person may add the entity to one of her social groups defined in the social network. In one embodiment, the fact that the person endorses an entity does not enable the entity to freely initiate full communications or posts with the person. Of course, if the person and the entity are socially linked, the entity may initiate communications with the person and post on the person's user account.

Figure 3:
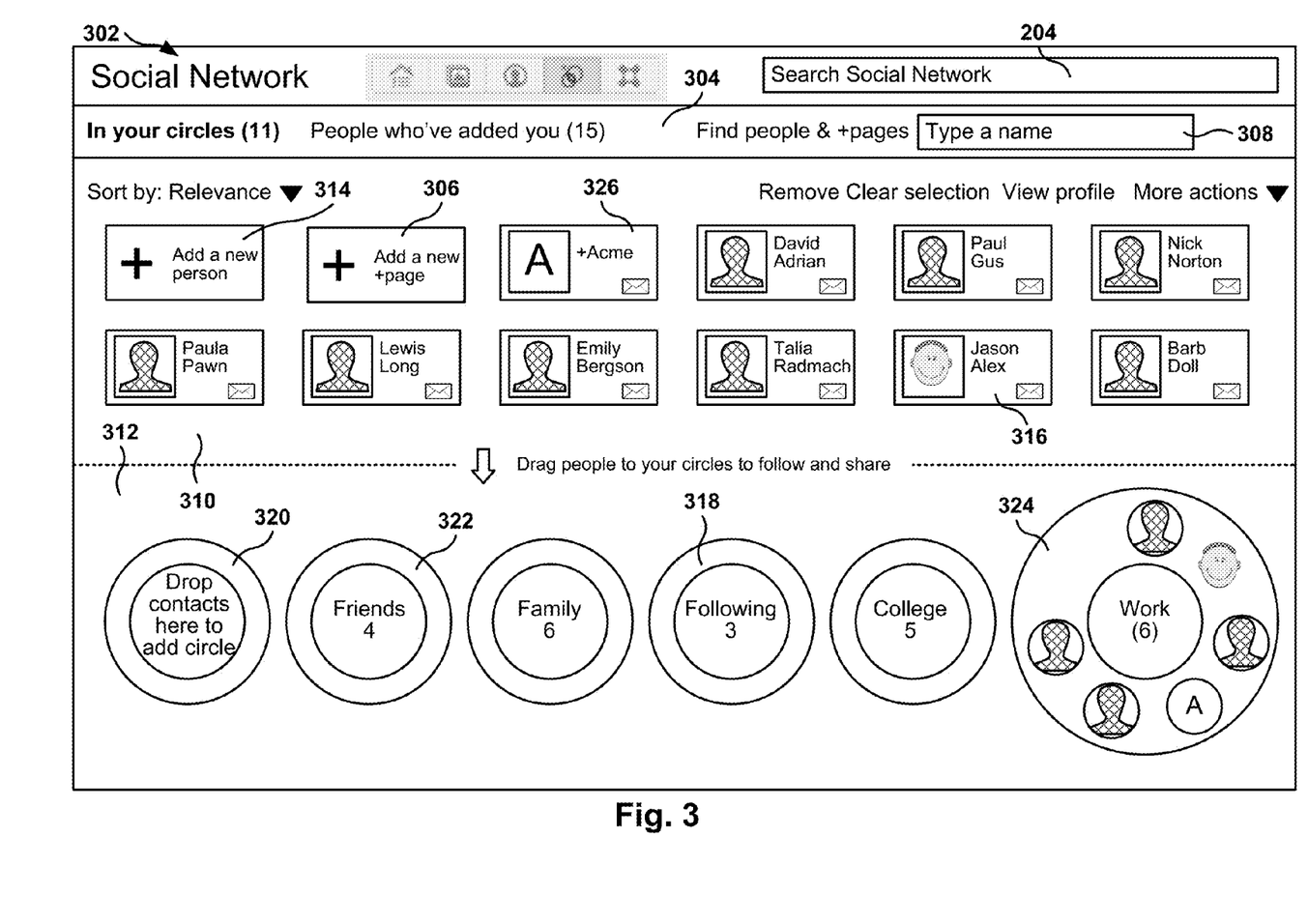
FIG. 3 is a web page for managing user groups within the social network, according to one embodiment.

FIG. 3 is a web page 302 for managing user groups within the social network, according to one embodiment. Bar 304 provides selections options for choosing users, which are then displayed in users area 310. In the embodiment shown in FIG. 3, the person has selected the option "In your circles" to display users that are currently in the person's circles (e.g., user defined groups). A second option in bar 304 allows the selection of persons that have added the owner of the page to their groups in the social network. In addition, bar 304 includes an input field 308 to search for people or entities. In one embodiment, the social network provides an option to follow other users anonymously. If a person follows another user anonymously, the person will be able to see the public posts of the user, and the person or entity being followed would not be aware that this person is following them.

User's area 310 displays icons, images, pictures or indicators associated with several users, and circles area 312 includes the groups defined by the user. In one embodiment, the person is able to add users to the circles in circles area 312 by selecting a user icon, dragging the icon to the circles area 312, and dropping the icon in one of the circles. To delete a user from a circle, the user icon inside the circle is dragged from the circle and dropped outside the circle. In one embodiment, when the person moves the mouse over a circle, the circle is enlarged to show the user icons corresponding to the users belonging to that circle. For example, after placing the mouse over circle 324, circle 324 is expanded, having now a larger size than the other circles, and presents the users currently in that circle. Other circles, such as circle 322 named "Friends," are presented in a smaller size than circle 324 and do not show their contents. To create a new circle, the person can drop a user from users area 310 in circle 320.

In one embodiment, the social network creates a default circle for inclusion of entity pages. The embodiment of FIG. 3 provides a circle 318 named "Following" for inclusion of entity pages. The entity pages do not have to be added to circle 318, and may be added to any of the circles defined by the person. In one embodiment, persons and entities can also be added to more than one circle. In one embodiment, when a person starts following an entity, the entity is automatically added to the "Following" circle, although the person may later remove the entity or move to another circle. In another embodiment, when the decision is made to follow an entity, a drop down provides the user with options to add the entity to any one of the circles previously created by the user or to a following circle. This option allows for direct adding of users to circles, without first adding them to the following circle 318.

The users in user area 310 can be real persons (e.g., person 316 "Jason Alex") or can be entities (e.g., entity 326 "+Acme"). People are able to place real persons or entities in any of the circles below, and a circle may have just people, just entities, or a mix of people and entities.

In one embodiment, user area 310 also includes a couple of selection boxes for adding persons 314 or entities (e.g., +pages) 306. When the person selects one of these boxes, options are presented to enter the name of a person or an entity, or to perform a search on the social network. In another embodiment, a unique box is presented to search for people or entities. In one embodiment, once the person enters a "+" sign as the first character of the search, the social network limits the search to entities. Otherwise, the search is limited to real persons. Again, it should be understood that any other symbol or token can be used to filter, identify or modify a search query.

Figure 4:
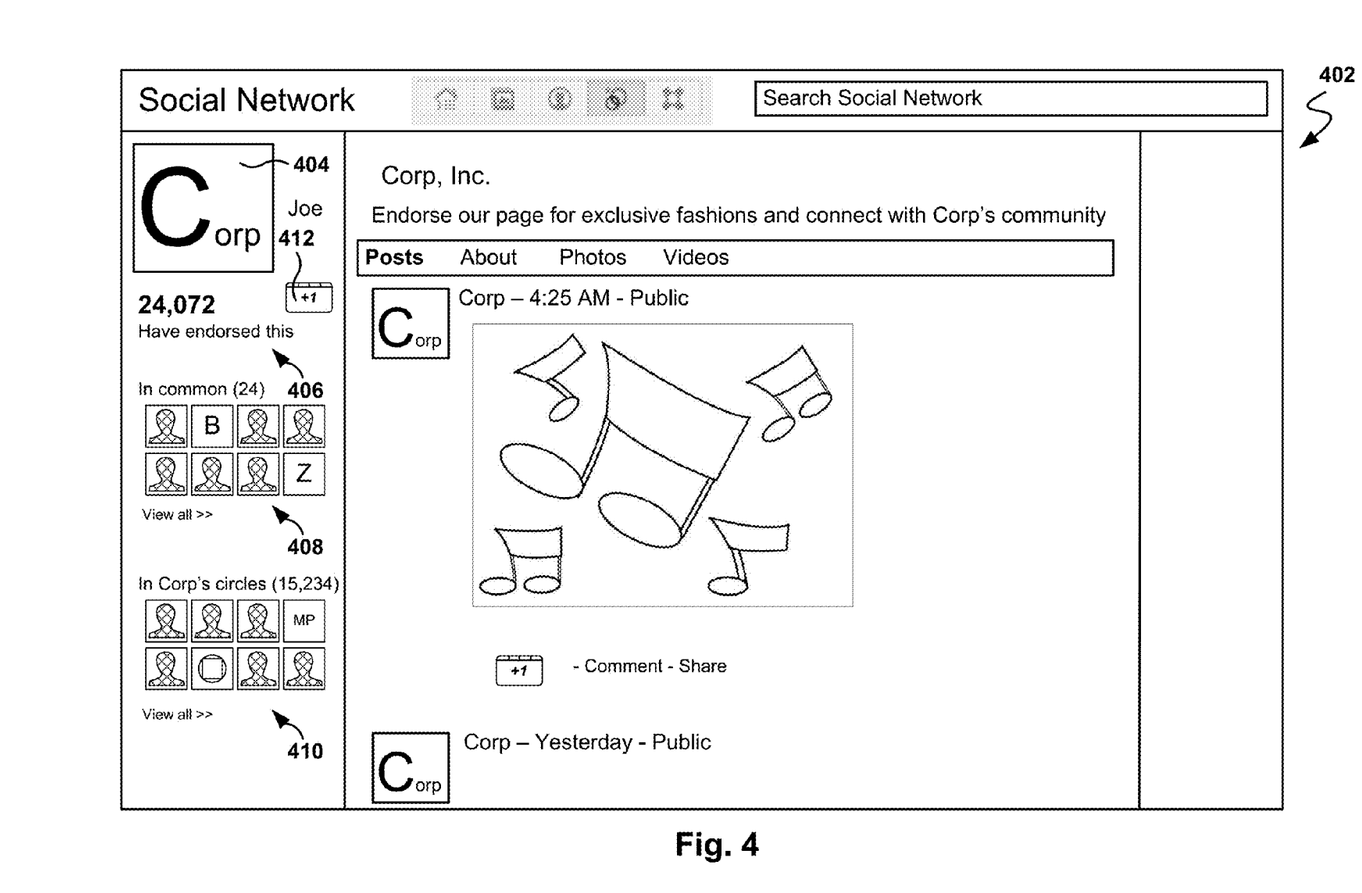
FIG. 4 shows a profile page of an entity in the social network, according to one embodiment.

FIG. 4 shows the profile page 402 of an entity in the social network, according to one embodiment. When a user clicks on the name of another user, the associated profile page for the user is presented. FIG. 4 shows the profile page of an entity. In the middle panel, posts from the entity that are visible to this user are presented, with a similar format to the posts shown in the stream of FIG. 3.

The profile page 402 includes a region that can accept an icon 404 associated with the entity and the name of the entity next to the icon 404. In addition, an endorsement button 412 gives the person or other entity an option for endorsing the entity associated with the profile page. Counter 406 provides information about the number of people or entities that have endorsed this entity. In one embodiment, the profile page of a person may not include endorsement button 412. In another embodiment, the social network allows for the endorsement of real people, and an endorsement button is available to endorse people.

Profile page 402 also includes information about users 408 in the user's circles that are also following this entity, e.g., users "in common" following this entity. This information helps the entity improve its corporate image by showing related users that also are associated with the entity. In addition, information 410 is provided about users or entities of the social network that are in the entity's circles but that are not currently in any of the user's circles.

In one embodiment, the social network enforces a privacy mechanic, e.g., a policy, to protect people from undesired messages. In one embodiment, the policy defines two types of users: people and entities. The communication rules in the social network are different for people and for entities. A person may initiate contact with an entity, but the entity may not initiate contact with the person. Once the person establishes a social link with the entity (e.g., the person adds the entity to one or more circles), then the entity may start communicating with the person. In one embodiment, an entity may initiate contact with other entities (of course, subject to user privacy settings), but not with real people (e.g., user accounts). This policy puts the person in command of the communication flow between people and entities.

In one embodiment, the privacy policy defines that people may not have automatic acceptance of tags for photos posted on the social network by entities. However, there can be automatic acceptance of tags from entities by other entities.

Figure 5:
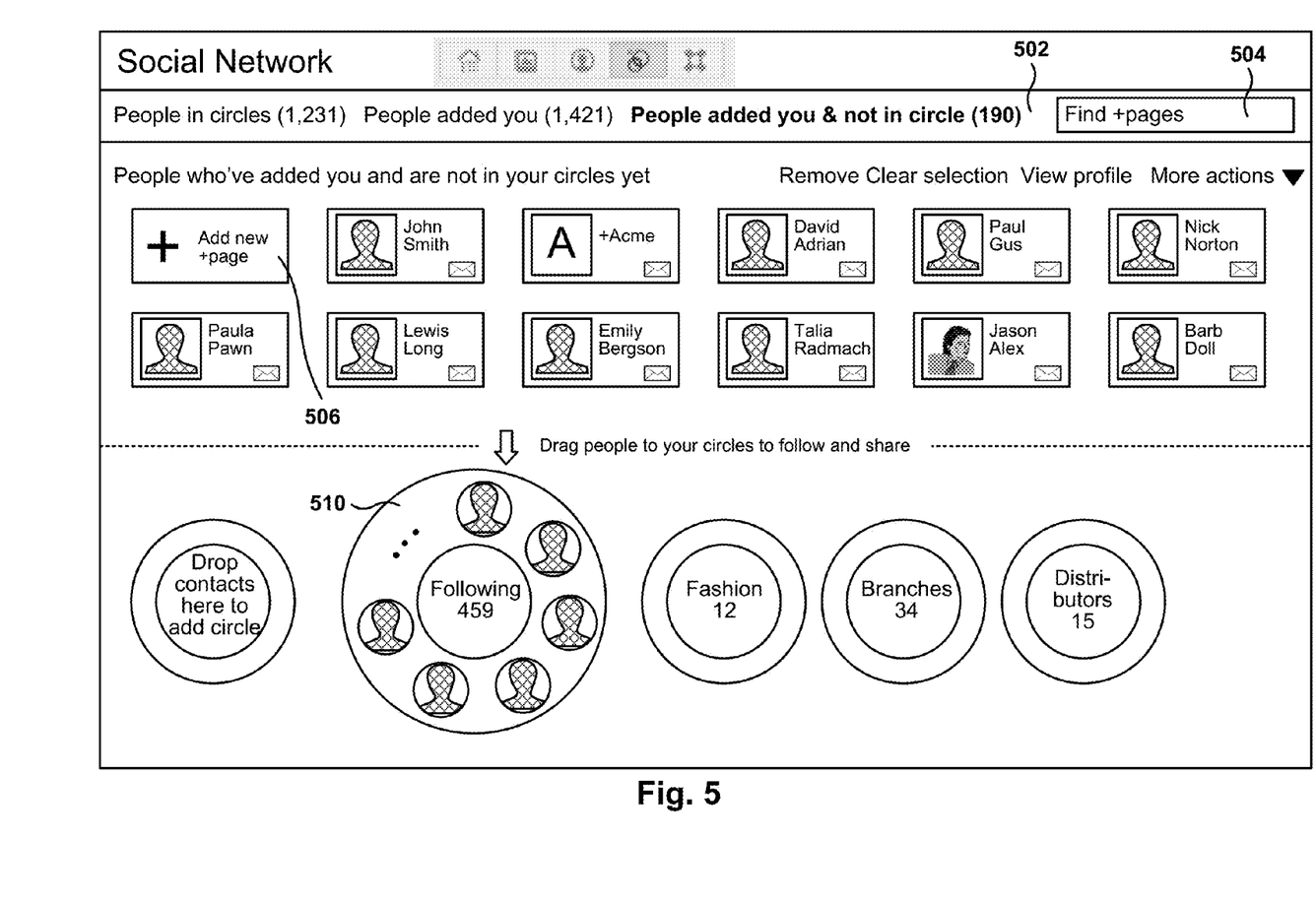
FIG. 5 is a web page for the management of user groups by an entity, according to one embodiment.

FIG. 5 is a web page for the management of user groups by an entity, according to one embodiment. Bar 502 for selecting users includes options for showing people already in the entity's circles, showing people that are following the entity, and showing people that are following the entity and not yet in a circle. The search box 504 is different from the search box 308 of FIG. 3 because an entity cannot search for people, or be allowed to find people to first approach. An entity may only search for other entities (e.g., +pages). Additionally, because the entity may not search for people, the circle editor for entities does not include the icon 314 of FIG. 3 to add new persons. Entities are only provided with icon 506 to add other entities. Although the functions of this mechanic are described with reference to icons that are present or not present, other icons, text, windows, selection features may be used.

In one embodiment, the social network provides a default circle 510 to the entity for adding users followed by the entity. Circle 510, named "Following" in the sample of FIG. 5, is intended to be used for adding users that are being followed by the entity, in response to the person's initiated following of the entity. However, the entity may add other circles and organize the users followed as desired by the administrator of the entity page. For example, the embodiment of FIG. 5 illustrates a page that includes, besides the Following circle 510, a Fashion circle (e.g., to include other related companies in the fashion industry), a branches circle (e.g., to include retail outlets for the entity), and a Distributors circle (e.g., to include the distributors that carry the entity's products).

The entity may add each user to more than one circle. For example, the entity might create circles by geographic location in order to better target marketing messages (e.g., United States, South America, Europe, Asia, etc.), or may create circles according to demographic criteria (e.g., 5-15 years old, 16-25, 25-50, and 51+). The number and type of circles (e.g., groups) created by the entity are limitless. The circles can be created for limited times, and people can be dynamically moved by the entity or an algorithm set by the entity.

In one embodiment, the social network provides an automatic creation of circles, based on the parameters selected by the entity and executed by the algorithm, or based on user characteristics. In one embodiment, this feature is referred to as "suggested circles." Each suggested circle is associated with a respective one or more attributes, such as geographic location, age range, gender, language, country, etc. When a person first starts following an entity, the person is automatically added to the entity's suggested circles that match the person's characteristics. For example, a person is added to a circle for the city of San Jose if the person lives in San Jose, the person is added to a circle for ages from 10 to 20 if the person is 19 years old, the person is added to a circle for United States if the person lives in the United States, etc.

It is noted that each person is added to suggested circles when the person has provided the corresponding information to the social network (e.g., provided the information to the user profile) and the person has allowed the social network to use this or part of the information for selection of people to be added to the corresponding circles. In one embodiment, the content of the suggested circles is not available for inspection by the entity. This way, the entity does not receive information about the person, although the entity can target its marketing messages to the appropriate segments due to the infrastructure provided by the suggested circles.

The mechanic of suggested circles, in one embodiment, is transparent to people, and settable by administrative functions of the entity. For example, a person might receive a message from a company, but the person does not know why she received the message. The reason the person received the particular message may be, for example, because the entity decided to send that message to all of the people or entities that were part of one of their circles. As another example, the entity may decide to move certain people and entities into a circle for an upcoming event. Before the event, the entity can set a campaign to notify those people and entities regarding information, specials, coupons, etc., as it pertains to the upcoming event. Once the event is done, the entity can manually move the people and entities back to their originally established default circles. In still another embodiment, the users that were added to the event circle can simply be copied (as a second instance) to the event circle. When the event is done, the event circle is deleted. The users, however, are still present in their previously defined circles of the entity.

In another embodiment, the suggested circles are administered by the entity because the social network provides information about the person to the entity (of course, the person's information (or only certain specific information) provided must be approved by the person). In one embodiment, the entity is able to manually assign people to suggested circles according to their characteristics in order to customize marketing communications or any other type of communication.

Figure 6:
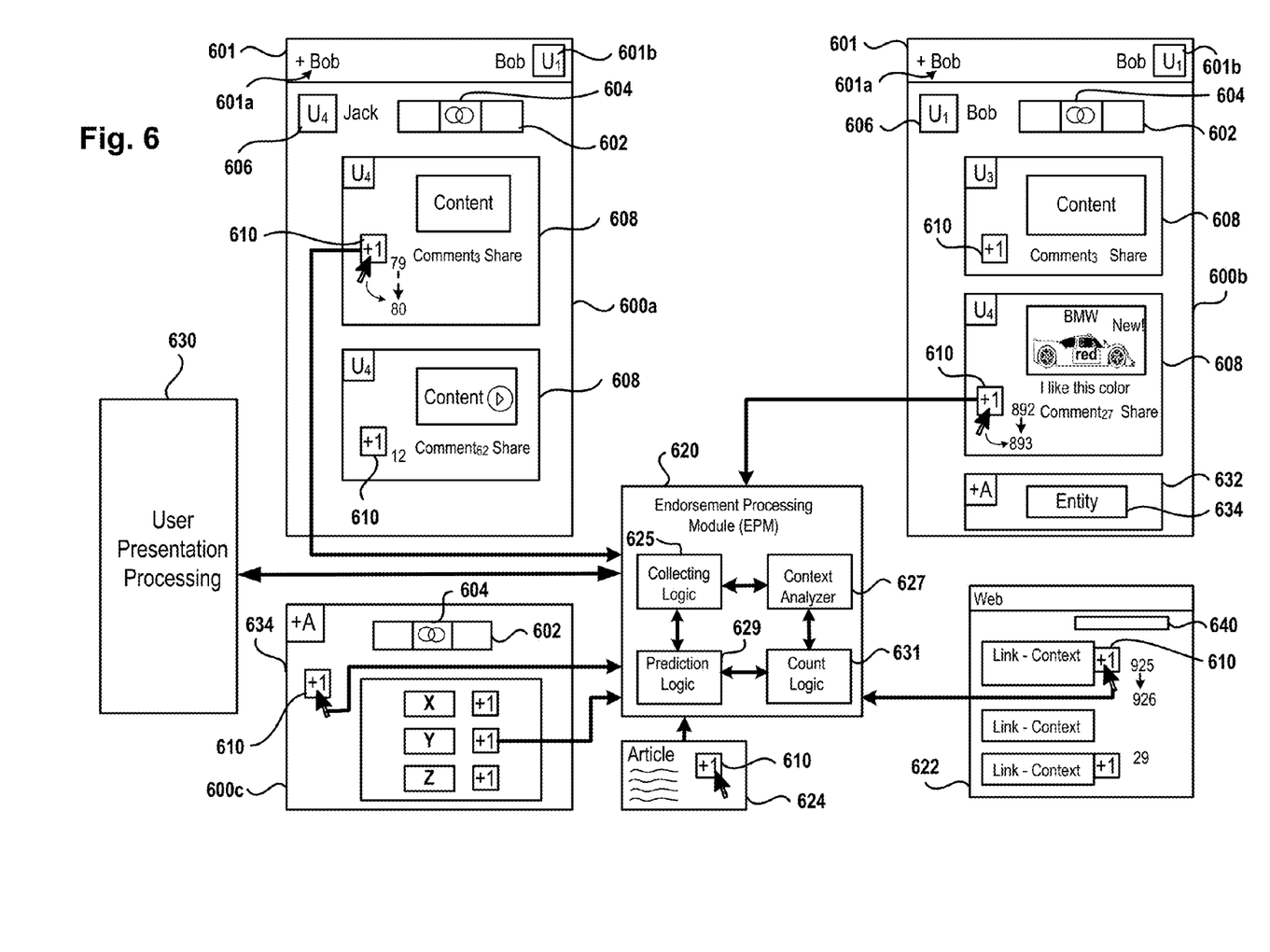
FIG. 6 illustrates a logical view of communication of endorsement information to an endorsement processing module, in accordance with one embodiment of the present disclosure.

FIG. 6 illustrates a logic diagram utilized by functional mechanics defined by the social network, for processing endorsements received from users and entities, in accordance with one embodiment of the present disclosure. As shown, a plurality of user interface views are defined to provide example view perspectives of accounts interfaced with a social network. A user account 600a illustrates an example where person Bob is logged in to his user account, and a bar 601 illustrates that Bob 601a (e.g., +Bob) is the person logged into the user account 600a. In one embodiment, Bob is also shown at the top rightmost section of bar 601 beside Bob's user identifier image 601b.

If Bob does not have an image or picture associated with his account, the user identifier image 601b will not show a picture or image, but the account for Bob will still be active. As the user provides additional information and customization to his account, Bob's image or picture may later be shown in the user identifier image 601b. For purposes of discussion, Bob's image is replaced with an identifier U1, signifying that Bob is user 1 (U1). In the example of user account 600a, the user interface shows a plurality of posts 608, which may be posted to a stream being viewed by Bob. In this case, the stream belongs to Jack, which is identified as user 4 (U4). Bob is therefore viewing Jacks stream, and Jacks posts 608 therefore made viewable to Bob, consistent with the relationship of privileges established between Bob and Jack.

Also shown in the user account 600a UI, is a view bar 602. The view bar 602 may include a plurality of controls, configuration icons, and other selectable features. One selectable feature may be a circle editor 604. The circle editor 604, as noted above, allows Bob to access Bob's groups that are defined as circles. The groups will include any number of persons or entities that Bob decided to add to the particular circles. Each of the posts 608 can include different types of content, which may be in the form of text, pictures, commentary, articles, videos, news clips, interesting data, or communications regarding a person place or thing. In this example, each of the postings by Jack may include an endorsement button 610. The endorsement button 610, as noted above, can be shown in any number of formats.

For purposes of illustration however, the endorsement button 610 is shown as a "+1" button. If Bob, who is viewing Jacks stream approves of, likes, or otherwise is interested in the post 608, the endorsement but and can be selected by Bob. If Bob selects the endorsement button 610, a count that keeps track of all other people or entities who have similarly endorsed post 608, will also increment. In this example, that endorsements count will increment from 79 to 80.

If the user were to select the endorsement button again, the account would then decrement back to 79. This mechanic will allow the social network to control inappropriate or repetitive selection of the endorsement button by a single user at one particular time.

Continuing with the example of FIG. 6, when Bob selects the endorsement button 610 on a posting by Jack, the endorsement button selection data will be communicated to the social network for processing. The communication is provided to in endorsement processing module (EPM) 620, which tracks endorsement data from various accounts in the social network, and other websites, articles, news pages, and sources that may include the capability of providing an endorsement for a particular piece of information or data. For example, if the content endorsed by Bob in Jacks comment was in relation to a particular type of automobile, other pages that could include an endorsement for that same particular type of automobile will also be analyzed by the endorsement processing module.

Endorsement processing module 620, in one embodiment, will include processing logic 625, context analyzer 627, prediction logic 629, in count logic 631. These logic modules function within or are associated with the endorsement processing module 622 to analyze the data received in response to users or entity selecting the endorsement button 610 across the social network, or outside the social network. In some embodiments, the endorsement button 610 may be selected on some post 608 that only includes text.

The endorsement processing module 620 can then collect the information regarding the text posted, and analyze the context of the text using the context analyzer 627. The context analyzer 627 may include semantic processing capabilities, to identify some topic, person, place, or thing that may be central to the text presented in the post 608. Based on the context identified by the context analyzer 627, the prediction logic 629 can identify a specific person place or thing that the endorsement should be associated with. In other embodiments, the endorsement button 610 can be provided for a very specific post 608, such as a post associated with a type of automobile (BMW 530i).

When the post 608 is very specific, less work will be needed by the context analyzer and the prediction logic to identify that the post relates to a specific automobile. However, when the endorsement button 610 is selected for more generic post content, the context analyzer will utilize semantic processing, prior search history data, demographic data, gender data, geo-location data, etc. to identify the most likely focus of the endorsement. Once the endorsement is associated to a specific person place or thing, the count logic 631 can increment the count for that specific person place or thing.

Once the count logic 631 increments the count, the other locations in which the endorsement button 610 is placed throughout the social network or other sites can be similarly incremented.

Still referring to FIG. 6, the top rightmost user interface shows a user account 600b, where Bob is now viewing his own stream. In Bob stream, Bob may have postings from his friends user 3 (U3) and user 4 (U4, Jack). In this example, Bob may endorse the posting by Jack by selecting the endorsement button 610, and including a comment "I like this color." When the user comments on the post, the commentary indicator will also increment. In any one of the posts 608, Bob can also share the post with other friends.

Again, once Bob has indicated in endorsement of the post by Jack, the endorsement count will also increment (892 is incremented to 893). Still further, Bob's stream shows that an entity +A 634 has also made a post 632. In this example, entity 634 is able to post to Bob's stream because Bob has at one point added entity 634 to his group or groups, and desires to follow entity 634. Once Bob selects to endorse the posting 608 by Jack, this information is also communicated to the endorsement processing module 620.

As noted above, this information is collected by the collecting logic 625, can be analyzed by the context analyzer 627, and the prediction logic 629. The count logic 631 can also increment the count for that specific endorsement button 610. In this case, the endorsement is for a specific type of car, and the context analyzer can quickly identify the context of the posting, which may have been provided by the original posting entity.

Also shown is an account of entity 634 (+A), which itself has its stream shown in some portion of its user interface. The entity 634 can also have a view bar 602 that will allow the entity to manage its users that may be following entity 634. Based on analysis of the specific users following entity 634, entity 634 can then move or organize those specific following users to specific groups (circles), and entity 634 can custom provide specific postings to those people in specific circles. In the example shown in the top right section of FIG. 6, entity 634 posted to Bob's account, because Bob had previously decided to follow entity 632.

In the account view of entity 634, users can view the page of entity 634. Users can view the various postings made by other users to entity 634 in the stream, and postings made by the entity 634 itself to its own stream. Entity 634 can also be endorsed by a user, such as Bob. When the user Bob endorses entity 634 by selecting endorsement button 610, that information is also transferred to the endorsement processing module 620. If Bob were to select and endorse other postings within entity 634, that information would also be provided to the endorsement processing module 620.

Still on FIG. 6, the bottom rightmost image shows a web page 622, which can also include a plurality of endorsement buttons 610. Endorsement buttons 610 can also be associated with specific links of the webpage 622. The specific links can be the result of a web search performed using a search bar 640 of website 622. Accordingly, the endorsement button 610 can be placed in account pages within the social network, or pages outside of the social network. The endorsement button 610 can also be placed on third-party websites, pages, news articles, mobile posts, and the like.

In a broad example, an article 624 is shown having an endorsement button 610. The article 624 can be viewed by a user on any device, such as a smart phone, a tablet, a laptop, a computing module, a television, or any other computing interface, and the endorsement selection by a user can be communicated over the Internet to the endorsement processing module 620. Accordingly, the endorsement processing logic 620 can be integrated with the social network, work in conjunction with the social network, or be integrated as a separate component outside of the social network.

If integrated as a separate component outside of the social network, the endorsement processing module 620 can process the logic information on any server or processing module connected to the Internet and the data can be processed and shared with the social network as shown by the arrow connection to the user presentation processing 630. The user presentation processing 630 is broadly shown as a module that will manage the profiles of persons and entities that may be utilizing the social network on specific accounts. Information obtained from the endorsement processing module 620 can then be utilized by the user presentation processing to provide intelligent posting data back to specific persons or entities utilizing the social network.

Figure 7:
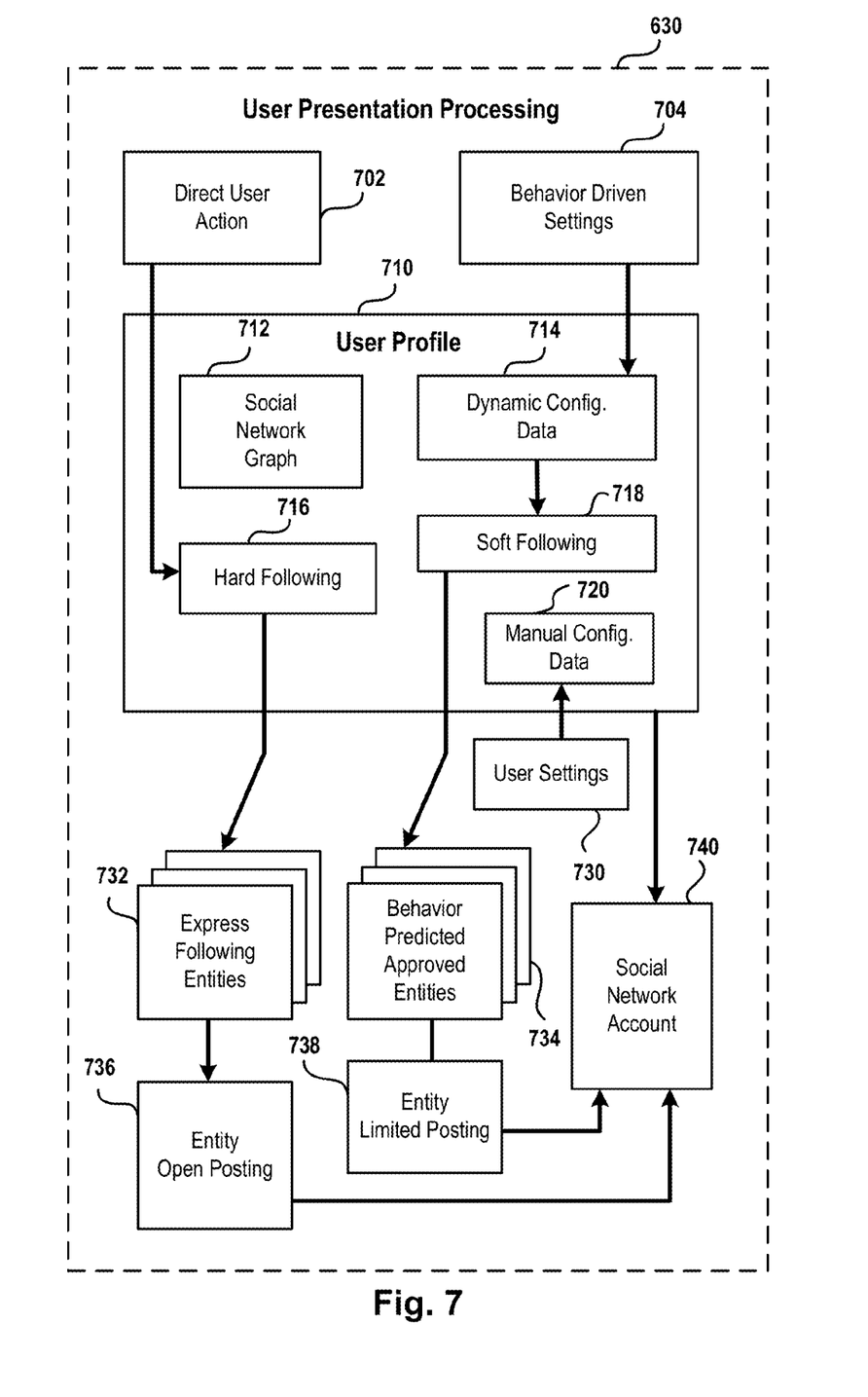
FIG. 7 illustrates a user presentation processing module, utilized for managing hard following data and soft following data for entities, in accordance with one embodiment of the present disclosure.

FIG. 7 illustrates functional block diagrams associated with user presentation processing 630, which was discussed with reference FIG. 6, in accordance with one embodiment of the present disclosure. As described above, a user can provide direct user action 702 to establish a hard following 716 of a specific entity. As described herein, a hard following is defined when a person decides to add an entity to one of his groups, and expressly decide to follow that specific entity.

For example, if the user decides the follow company X because the user likes the products by company X, that users direct action 702 will establish a hard following in the user profile 710 of the specific user. The direct user action 702 can also be defined by an entity who has decided to follow another entity by adding that entity to one of its groups (circles). In that case, that entity has taken the direct action to hard follow a specific entity in one of its circles, or in more than one of its circles if the entity decides to add the followed entity to more than one group. The user profile 710 is also associated with a social network graph 712.

The social network graph defines the grid of interconnected users that the specific user is associated with. For example, if a user has five friends in specific circles, it is also known which friends those friends have, and which friends those friends have, and so on. Whether or not one friend can view profile data of another friend is defined by whether or not one friend is following another friend and if the other friend is following that same friend back. The user profile can also include user settings 730 that are provided as manual configuration data 720 within the user profile 710. The manual configuration data can consist of the users name, gender, birth date, picture, and other identifying information useful for sharing with the user's friends or entities.

In one embodiment, the logic regarding who is following who and how, as it corresponds to a specific user, can be managed by the social network graph 712 of the specific user. This data is then replicated for all users, as every user will have a different social network graph, when viewed from the perspective of a specific user. If a particular entity is been hard followed, that information is provided to a database of express following entities 732. Those express following entities 732 can then be allowed to open or free post to the accounts that are following that entity by entity open posting 736 logic. Entity open posting 736 will designate if the specific entity is allowed to post to specific accounts within the social network accounts 740.

In another embodiment, behavior driven settings 704 identify a limited posting capability for entities into specific accounts of the social network. Behavior driven settings are learned metrics associated with user actions, such as a user selection of particular enforcement button 610 across the Internet. If a particular user has endorsed a number of vehicles on various postings, search pages, or websites, the behavior has indicated that the user has a tendency to like or has an interest in vehicles. This deduction can be obtained from the endorsement processing module 620, and can also be fine-tuned based on processing performed by the context analyzer 627 and the prediction logic 629.

The behavior driven settings 604 can therefore be populated into the user profile 710 in a dynamic configuration data module 714. The dynamic configuration data module 714 is configured to store data periodically over time, based on the behavior of the user. The behavior of the user can change over time, and the user can go from having a strong interest in automobiles to a stronger interest in jewelry. When it is detected that the users interests have shifted, the configuration data provided by the behavior driven settings 704 can be adjusted dynamically, so as to provide the user with more accurate dynamic configuration data in the user profile 710.

Although the users configuration data can be dynamically changing in 714, this data can also hold historical data from earlier activity, and the resulting dynamic configuration data can be a blend of historical behavior and current behavior. The information can also be used to provide the user with more accurate user profile postings from specific entities, based on whether the user has a tendency to endorse that particular entities products or services. Using the data in the dynamic configuration data 714, soft following data 718 is generated. Soft following data 718 can consist, in one embodiment, in identified entities that the user has some inclination to follow, but has not yet indicated a hard following for that entity. If a user has a tendency to, but has not added any automobile sites to a hard following 716, that information can be stored in the soft following data 718.

Because the user of user profile 710 has particular soft following data 718 is profile, that information is most likely to be received by the user in a positive manner, as the user is already having a tendency based on behavior to follow, but has not indicated a hard following. The soft following data in 718 may be provided to behavior predicted entities 734. For example, if the user has a tendency to select car sites, that user's soft following data 718 can be provided to a car entity, and the car entity can be provided with limited posting access to the account of the user in the social network accounts 740.

In still another embodiment, the soft following and hard following data is a metric. The metric is a value that can change from either yes/no, 1/0, etc, or a multilevel value. For the hard following metric, a person is either following or not following. For a soft metric, the person is either endorsing frequently, endorsing less frequently, or endorsing frequently in a recent past, e.g., such as in the past week the user has endorsed the entity 10 plus times. In one embodiment, the multilevel value can define a soft following range from between 1 to 100, where 100 is strong endorsement, and 1 is low endorsement. The level of endorsement can change over time, such that the user can have a level 3 one week, and a level 30 another week, and back to a level 10 in a next week. Thus, soft following metric dynamically changes over time based on the level of endorsement, such that the soft following metric increases or decreases as the level of endorsement increases or decreases. In still another embodiment, the level of endorsement is weighted based on how recent each one of the endorsements by the person are of the entity.

If the endorsements are recent, the prior endorsing level can be multiplied by some factor (e.g., by some percentage increase). If the endorsements are in the extended past, the level can be multiplied by some corresponding factor to lower the level. In this manner, the soft following metric allows for controlled and intelligent throttling of the endorsement level, and thus the level of access can be controlled to allow more or less posting. In either event, the posting allowed with soft flowing will be less than hard following, as the user in hard following has taken direct action to add the entity to a circle or group.

Limited posting capabilities for the entity can be in the form of short messages, offers, and other posting data that is less than the data provided when hard following has been dictated, but still provides the user with the capability to receive limited postings. The user receiving limited postings can also decide to switch soft following entities to hard following entities.

Hard following data and soft following data, therefore can be used to adjust the degree of freedom that an entity has to post on a particular account. The throttling is provided because soft following indicators do not allow full access to user accounts until the user has decided to hard follow a specific entity. This control provided to a user establishes a mechanic that is multi-level. This mechanic is considered a multilevel mechanic, as the level of freedom and entity is given to access a user account to post is throttled based on the user's actual behavior, and/or express indication to follow a specific entity.

If a user is only slightly endorsing a specific entity, the behavior throttles less access to that user's account by an entity. However, as a user targets more endorsement toward a particular entity, the multilevel value assigned to the throttling is increased to allow the entity to provide more enticing posts or invitations to the user to potentially entice the user to hard follow the entity. Accordingly, this multilevel throttling of endorsement is custom tailored to the user's behavior and spans a level of degrees between no interest by the user (no endorsement whatsoever of an entity), to a high degree of endorsement but no following. Even if a high degree of endorsement is detected, that high degree is provided a higher level of likelihood to hard follow, and is therefore throttled to allow the entity to provide more enticing invitations to the user to add the entity as an been followed in a specific group of the user.

The more the user is endorsing a specific entity, that user will be considered to be making an educated choice to potentially follow that specific entity, and the delivery of posts, commentaries, or data can be varied or throttled based on the degree assigned to the behavior detected of the user.

In still another embodiment, the limited posting to the user account can be in the form of a menu that lists various entities that may be of interest to the user, and the user can then decide to make those hard following entities. As such, the limited posting does not actually allow posting to the actual account in a posting location of a stream, but can provide a listing, or suggestion box of entities that the user may wish to add as a hard following entity.

As noted above, a hard following entity is one that the user has expressly taken direct action to add the entity to one of its groups (circles), and has a desire to follow that specific entity.

In another embodiment, a hard following can be deduced from acts of the user or associations of the user to other users. These acts are implicit acts that may be represented as implicit links that identify a user's desire to hard follow a particular entity. Examples of these implicit links can include, for example, check-ins to a store using a mobile device, searching for a brand on a web search box, hard links from a critical mass of your friends, etc.

Figure 8:
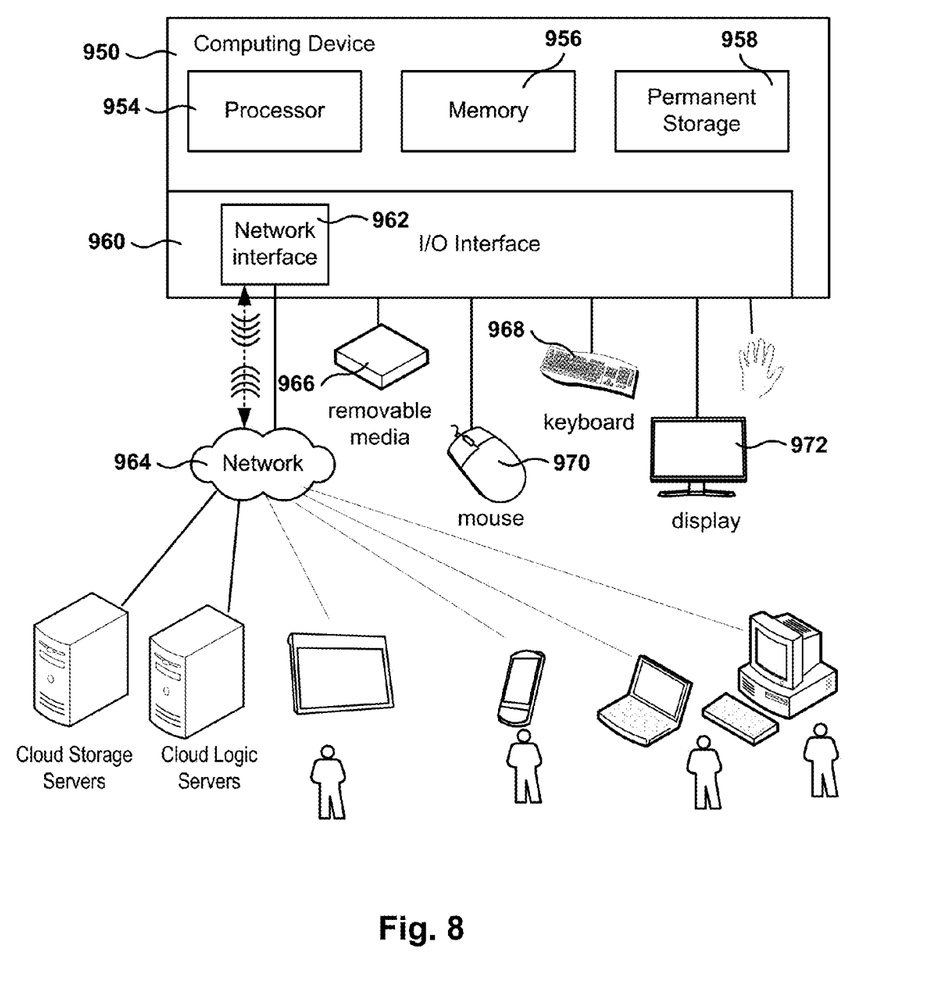
FIG. 8 is a simplified schematic diagram of a computer system for implementing embodiments of the present disclosure.

FIG. 8 is a simplified schematic diagram of a computer system for implementing embodiments of the present disclosure. It should be appreciated that the methods described herein may be performed with a digital processing system, such as a conventional, general-purpose computer system. Special purpose computers, which are designed or programmed to perform only one function, may be used in the alternative. The computing device 950 includes a processor 954, which is coupled through a bus to memory 956, permanent storage 958, and Input/Output (I/O) interface 960.

Permanent storage 958 represents a persistent data storage device such as a hard drive or a USB drive, which may be local or remote. Network interface 962 provides connections via network 964, allowing communications (wired or wireless) with other devices. It should be appreciated that processor 954 may be embodied in a general-purpose processor, a special purpose processor, or a specially programmed logic device. Input/Output (I/O) interface 960 provides communication with different peripherals and is connected with processor 954, memory 956, and permanent storage 958, through the bus. Sample peripherals include display 972, keyboard 968, mouse 970, removable media device 966, etc.

Display 972 is configured to display the user interfaces described herein. Keyboard 968, mouse 970, removable media device 966, and other peripherals are coupled to I/O interface 960 in order to exchange information with processor 954. It should be appreciated that data to and from external devices may be communicated through I/O interface 960. Embodiments of the disclosure can also be practiced in distributed computing environments where tasks are performed by remote processing devices that are linked through a wired or a wireless network.

Embodiments of the present disclosure can be fabricated as computer readable code on a non-transitory computer readable storage medium. The non-transitory computer readable storage medium holds data which can be read by a computer system. Examples of the non-transitory computer readable storage medium include permanent storage 958, network attached storage (NAS), read-only memory or random-access memory in memory module 956, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor, such as processor 954 of FIG. 8. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Further shown are a plurality of other devices, storage, and services that may be connected to network 964. Network 964 can be, for example the Internet. The Internet is interconnected with a plurality of devices, such as cloud storage servers, cloud logic servers, user interface devices, etc. Some devices that can communicate with the Internet access services on various cloud logic servers and cloud storage can include, for example tablet computers, smart phones, laptops, desktop computers, television systems, and the like. The devices that can communicate with each other require at least a processor, and a display for presenting user interface views from selected programs and code that render the user interfaces. The user interface can be provided through keyboard entry, text entry, voice entry, gesture entry, and combinations thereof.

The user interfaces can be presented in browsers of the various devices, can interpret HTML code, can render video, can communicate over the Internet by way of wireless communication, can render Flash video data, and the like. All of these devices, hardware implementations, and code are configured for enabling the interfacing and interaction with the social network, and the users of the social network, and users on various websites connected to the Internet. The interaction, through social networks will enable communication regarding current information, shared interests, chat communication, video communication, and general posting, interests, and relationship management. Broadly speaking, a social network is a site that allows at least two people or entities to communicate with one another and share at least one piece of data.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed is:

1. A method comprising:
providing a user account, in a social network system, comprising information that identifies a person associated with the user account;
receiving one or more user interactions by the user account with content presented in a user interface on a display device, wherein the content is associated with a first entity account in the social network system, wherein the user interactions comprise one or more endorsements of the content or the first entity account by the user account, and wherein the endorsements are associated with a soft following metric;
identifying a second entity account in the social network system selected for following by the user account, wherein the selection for following is triggered by direct action by the user account to add the second entity account to one or more groups for the user account, and wherein the selection for following is associated with a hard following metric that allows the second entity account to post data to a stream of the user account within a stream user interface of the social network system; and
providing, by one or more processors in the social network system, the first entity account with limited access to post data to the stream of the user account based on a level of endorsement of the first entity account defined by the soft following metric, wherein the limited access to post data to the stream of the user account comprises less than free access to post data to the stream of the user account as compared to the second entity account associated with the hard following metric for the user account.

2. The method of claim 1, wherein the level of endorsement is set dynamically based on past historical endorsements of the first entity account or content associated with the first entity account, and wherein the first entity account represents a commercial entity that markets goods or services.

3. The method of claim 1, wherein the information that identifies the person associated with the user account comprises a name of the person and social graph associations with other people having user accounts in the social network system.

4. The method of claim 1, wherein receiving the user interactions comprises receiving a selection by the user account of an endorsement input control located on a webpage beside an item of the content related to the first entity account.

5. The method of claim 1, wherein the limited access dynamically changes over time based on the level of endorsement, such that the limited access increases or decreases as the level of endorsement increases or decreases.

6. The method of claim 1, wherein the level of endorsement is weighted based on how recent each one of the endorsements by the user account occurred.

7. The method of claim 1, wherein the second entity account represents a commercial entity that markets goods or services, and wherein data posted by the second entity account to the stream of the user account is in relation to the goods or the services.

8. The method of claim 1, wherein the selection for following triggered by the direct action to add the second entity account to the groups for the user account comprises an association of the second entity account with a circle in a management user interface for the user account, wherein the circle represents one of the groups, and wherein the circle is a graphical organizational tool of the social network system.

9. The method of claim 1, wherein the direct action by the user account comprises dragging an icon representing the second entity account to one or more circles that represent the groups for the user account.

10. The method of claim 1, wherein the data posted by the first entity account and the data posted by the second entity account to the stream of the user account comprise one or more of comments, images, advertisements, images, videos, or pictures.

11. The method of claim 1, further comprising receiving a subsequent direct action to remove the second entity account from the groups of the user account, wherein the removal automatically removes the user account from any group established on the second entity account in the social network system, and wherein the removal disables the posting of data to the stream of the user account by the second entity account.

12. A method comprising:
receiving one or more user interactions by a user account in a social network system with content presented in a user interface on a display device, wherein the content is associated with a first commercial entity account in the social network system, wherein the user interactions comprise one or more endorsements of the content or the first commercial entity account by the user account, and wherein the endorsements are associated with a soft following metric;
identifying a second commercial entity account in the social network system selected for following by the user account, wherein the selection for following is triggered by direct action by the user account to add the second commercial entity account to one or more groups for the user account, and wherein the selection for following is associated with a hard following metric that allows the second commercial entity account to post data to a stream of the user account within a stream user interface of the social network system; and providing, by one or more processors in the social network system, the first commercial entity account with limited access to post data to the stream of the user account based on a level of endorsement of the first commercial entity account defined by the soft following metric, wherein the limited access to post data to the stream of the user account comprises less than free access to post data to the stream of the user account as compared to the second entity account associated with the hard following metric for the user account.

13. The method of claim 12, wherein the endorsements are made within the social network system or sites outside of the social network system, and wherein a count of the endorsements is maintained for a global count and for the user account.

14. The method of claim 12, wherein the level of endorsement is set dynamically based on past historical endorsements of the first commercial entity account or content associated with the first commercial entity account, and wherein the first commercial entity account represents a commercial entity that markets goods or services.

15. The method of claim 12, wherein the user account comprises information that identifies a person associated with the user account, wherein the information comprises a name of the person and social graph associations with other people having user accounts in the social network system, wherein the selection for following triggered by the direct action to add the second commercial entity account to the groups for the user account comprises an association of the second commercial entity account with a circle in a management user interface for the user account, wherein the circle represents one of the groups, and wherein the circle is a graphical organizational tool of the social network system.

16. The method of claim 12, wherein receiving the user interactions comprises receiving a selection by the user account of an endorsement input control located on a webpage beside an item of the content related to the first commercial entity account, and wherein the data posted by the first commercial entity account and the data posted by the second commercial entity account to the stream of the user account comprise one or more of comments, images, advertisements, images, videos, or pictures.

17. A non-transitory computer-readable storage medium having instructions stored therein that, when executed by one or more processors, perform operations comprising:
providing a user account, in a social network system, comprising information that identifies a person associated with the user account;
receiving one or more user interactions by the user account with content presented in a user interface on a display device, wherein the content is associated with a first entity account in the social network system, wherein the user interactions comprise one or more endorsements of the content or the first entity account by the user account, and wherein the endorsements are associated with a soft following metric;
identifying a second entity account in the social network system selected for following by the user account, wherein the selection for following is triggered by direct action by the user account to add the second entity account to one or more groups for the user account, and wherein the selection for following is associated with a hard following metric that allows the second entity account to post data to a stream of the user account within a stream user interface of the social network system; and providing, by the processors in the social network system, the first entity account with limited access to post data to the stream of the user account based on a level of endorsement of the first entity account defined by the soft following metric, wherein the limited access to post data to the stream of the user account comprises less than free access to post data to the stream of the user account as compared to the second entity account associated with the hard following metric for the user account.

18. The computer-readable medium of claim 17, wherein the limited access dynamically changes over time based on the level of endorsement, such that the limited access increases or decreases as the level of endorsement increases or decreases, wherein the level of endorsement is weighted based on how recent each one of the endorsements by the user account occurred, wherein the first entity account and the second entity account represent commercial entities that market goods or services, and wherein the data posted by the first entity account and the data posted by the second entity account to the stream of the user account comprise one or more of comments, images, advertisements, images, videos, or pictures.

19. A system comprising:
an interface, in a social network system, to receive one or more user interactions by a user account in the social network system with content presented in a user interface on a display device, wherein the content is associated with a first commercial entity account in the social network system, wherein the user interactions comprise one or more endorsements of the content or the first commercial entity account by the user account, and wherein the endorsements are associated with a soft following metric;
one or more processors, in the social network system, to communicate with the interface to:
identify a second commercial entity account in the social network system selected for following by the user account, wherein the selection for following is triggered by direct action by the user account to add the second commercial entity account to one or more groups for the user account, and wherein the selection for following is associated with a hard following metric that allows the second commercial entity account to post data to a stream of the user account within a stream user interface of the social network system; and
provide the first commercial entity account with limited access to post data to the stream of the user account based on a level of endorsement of the first commercial entity account defined by the soft following metric, wherein the limited access to post data to the stream of the user account comprises less than free access to post data to the stream of the user account as compared to the second entity account associated with the hard following metric for the user account.

20. The system of claim 19, wherein the endorsements are made within the social network system or sites outside of the social network system, and wherein a count of the endorsements is maintained for a global count and for the user account.

21. The system of claim 19, wherein the level of endorsement is set dynamically based on past historical endorsements of the first commercial entity account or content associated with the first commercial entity account, and wherein the first commercial entity account represents a commercial entity that markets goods or services.

22. The system of claim 19, wherein the user account comprises information that identifies a person associated with the user account, and wherein the information comprises a name of the person and social graph associations with other people having user accounts in the social network system.

23. The system of claim 19, wherein the selection for following triggered by the direct action to add the second commercial entity account to the groups for the user account comprises an association of the second commercial entity account with a circle in a management user interface for the user account, wherein the circle represents one of the groups, and wherein the circle is a graphical organizational tool of the social network system.

24. The system of claim 19, wherein, to receive the user interactions, the processors are to receive a selection by the user account of an endorsement input control located on a webpage beside an item of the content related to the first commercial entity account, and wherein the data posted by the first commercial entity account and the data posted by the second commercial entity account to the stream of the user account comprise one or more of comments, images, advertisements, images, videos, or pictures.

\* \* \* \* \*